(12) United States Patent  
Mochizuki et al.

(10) Patent No.: US 8,767,221 B2  
(45) Date of Patent: Jul. 1, 2014

(54) INFORMATION PROCESSING APPARATUS, COMPUTER PROGRAM PRODUCT, AND INFORMATION PROCESSING METHOD CONFIGURED TO ROTATE DOCUMENTS

(75) Inventors: Toshihiro Mochizuki, Tokyo (JP); Shizhong Zhu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 132 days.

(21) Appl. No.: 13/292,512

(22) Filed: Nov. 9, 2011

(65) Prior Publication Data

US 2012/0120421 A1 May 17, 2012

(30) Foreign Application Priority Data

Nov. 17, 2010 (JP) .................................. 2010-256845  
Oct. 13, 2011 (JP) .................................. 2011-226220

(51) Int. Cl.  
*G06K 15/00* (2006.01)

(52) U.S. Cl.  
USPC ............ 358/1.12; 358/1.5; 358/1.9; 358/449; 358/488; 399/376; 271/9.06; 271/226

(58) Field of Classification Search  
USPC ............... 358/1.5, 1.9, 2.1, 1.12, 449, 488; 399/82, 85, 86, 193, 376; 271/9.06, 271/226; 270/37  
See application file for complete search history.

(56) References Cited

U.S. PATENT DOCUMENTS

| 2002/0090223 A1* | 7/2002 | Ohtani ............................ 399/82 |
| 2003/0020956 A1* | 1/2003 | Goel et al. .................. 358/1.18 |
| 2005/0207812 A1* | 9/2005 | Miyazaki ...................... 399/407 |

FOREIGN PATENT DOCUMENTS

| JP | 2000-339121 | 12/2000 |
| JP | 2006-192580 | 7/2006 |
| JP | 3824918 | 7/2006 |
| JP | 2006-311065 | 11/2006 |

* cited by examiner

*Primary Examiner* — King Poon  
*Assistant Examiner* — Jamares Q Washington  
(74) *Attorney, Agent, or Firm* — Cooper & Dunham LLP

(57) ABSTRACT

An information processing apparatus connected to an image forming apparatus includes: a size detecting unit that detects a size of each page of a document to be printed; an orientation detecting unit that detects orientation of each page of the document; a receiving unit that receives a setting of post processing that is to be performed on a printed sheet on which the document is printed; a determining unit that determines whether pages of different sizes, both having one side of the same length and other sides of different lengths, are detected in the document; a rotation control unit that, when the determining unit determines that the pages of the different sizes have been detected, rotates pages so that sides of the same length are aligned on the basis of the setting of the post processing; and an output unit that outputs the document with the pages rotated.

6 Claims, 12 Drawing Sheets

FIG.3
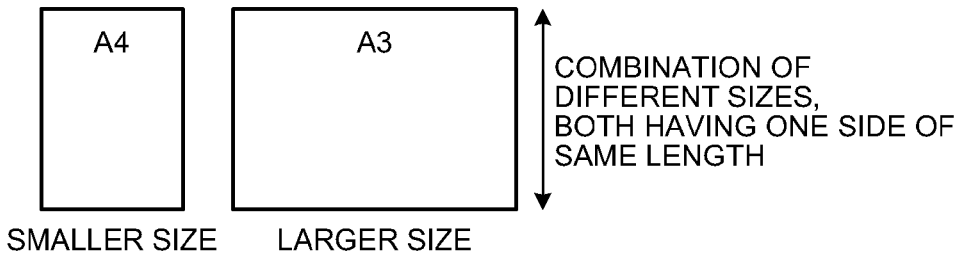
FIG.4
| ITEM NUMBER | SMALLER SIZE | LARGER SIZE |
|---|---|---|
| 1 | A4 | A3 |
| 2 | B5 | B4 |
| 3 | LETTER | DLT |
| 4 | 16K | 8K |
FIG.5
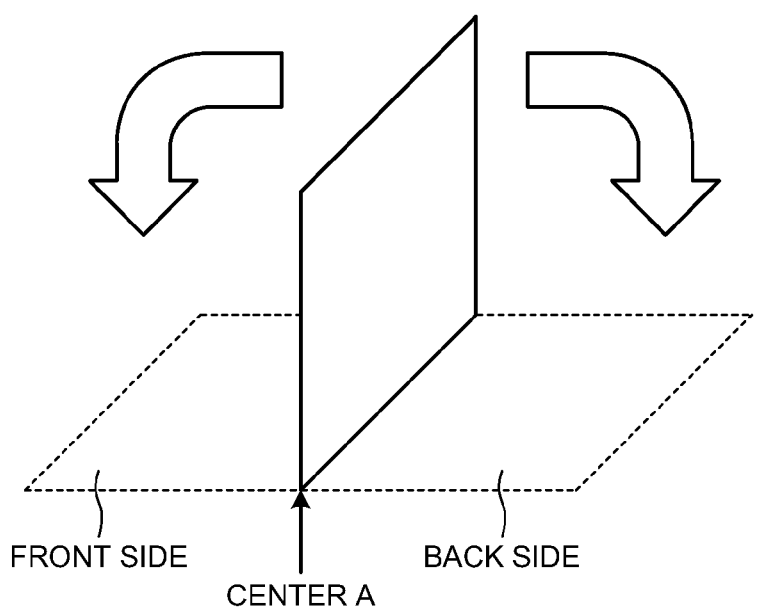

FIG.8A
(OUTPUT OF PRINTER A)
FIRST PAGE        SECOND PAGE
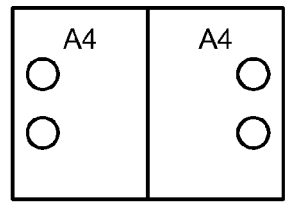
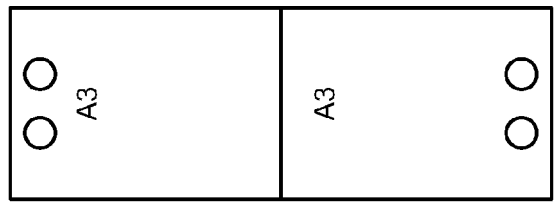
FIG.8B
(OUTPUT OF PRINTER B)
FIRST PAGE        SECOND PAGE
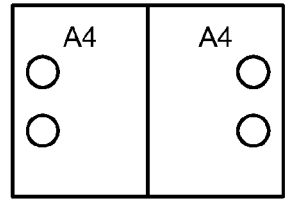
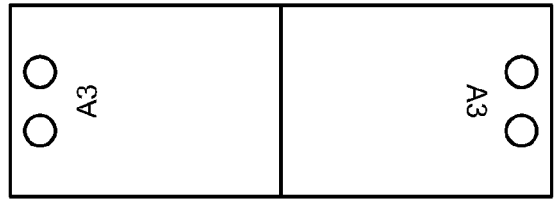
FIG.9
(PAGES OF DOCUMENT (AFTER ROTATION))
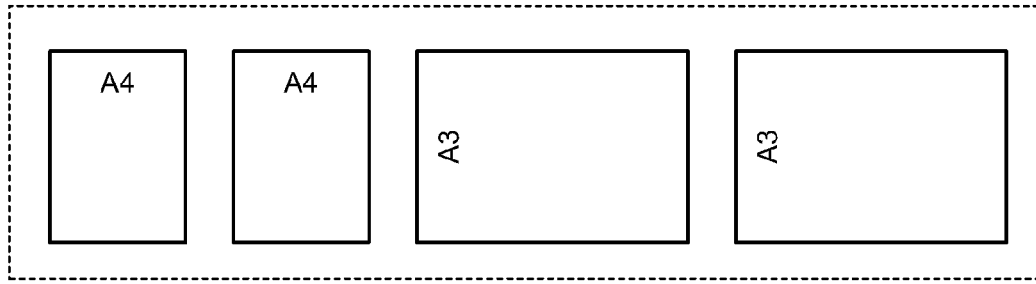
FIG.10
(OUTPUT OF PRINTER)
FIRST PAGE        SECOND PAGE
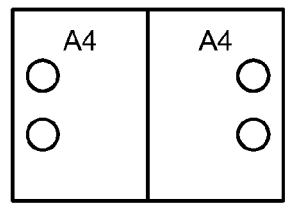
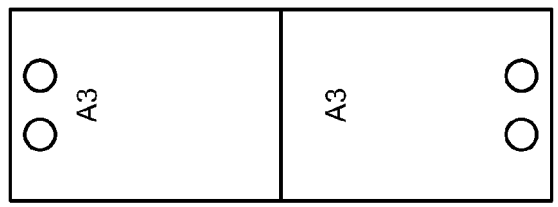

FIG.12
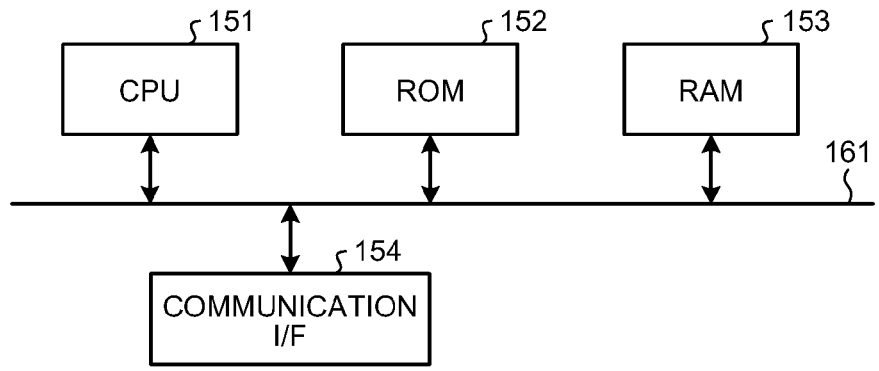
FIG.13
1300(o). FIRST PAGE OF DOCUMENT IS ARRANGED IN "VERTICAL (PORTRAIT)" ORIENTATION
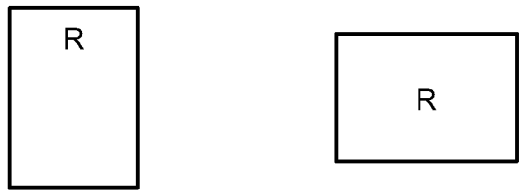
1300(a). WITH SETTING OF "OPEN TO LEFT"
1300(b). WITH SETTING OF "OPEN TO RIGHT"
1300(c). WITH SETTING OF "OPEN TO TOP"

FIG.14

1400(o). FIRST PAGE OF DOCUMENT IS ARRANGED IN "HORIZONTAL (LANDSCAPE)" ORIENTATION

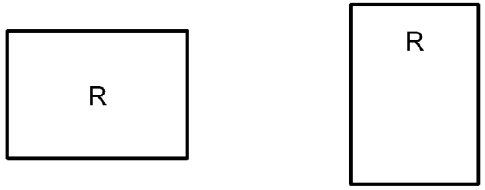

1400(a). WITH SETTING OF "OPEN TO LEFT"

1400(b). WITH SETTING OF "OPEN TO RIGHT"

1400(c). PREVIEW IMAGE WITH SETTING OF "OPEN TO TOP"

FIG.15

| ITEM NUMBER | SIZE OF FIRST PAGE | ORIENTATION OF FIRST PAGE OF DOCUMENT | ORIENTATION FOR SMALLER SIZE SHEET | ORIENTATION FOR LARGER SIZE SHEET | AVAILABLE POST PROCESSING |
|---|---|---|---|---|---|
| 1 | SMALLER SIZE SHEET | PORTRAIT | PORTRAIT | LANDSCAPE | "OPEN TO LEFT", "OPEN TO RIGHT" |
| 2 | SMALLER SIZE SHEET | LANDSCAPE | LANDSCAPE | PORTRAIT | "OPEN TO TOP" |
| 3 | LARGER SIZE SHEET | PORTRAIT | LANDSCAPE | PORTRAIT | "OPEN TO TOP" |
| 4 | LARGER SIZE SHEET | LANDSCAPE | PORTRAIT | LANDSCAPE | "OPEN TO LEFT", "OPEN TO RIGHT" |

FIG.16
1600(o). FIRST PAGE IS SMALLER SIZE SHEET ARRANGED IN "PORTRAIT" ORIENTATION
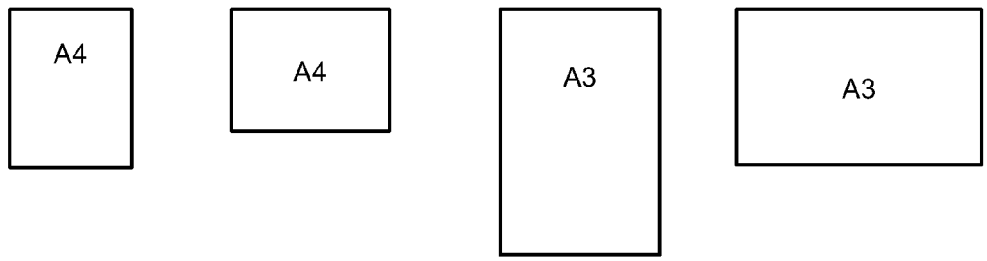
1600(a). PREVIEW IMAGE WITH SETTING OF "OPEN TO LEFT"
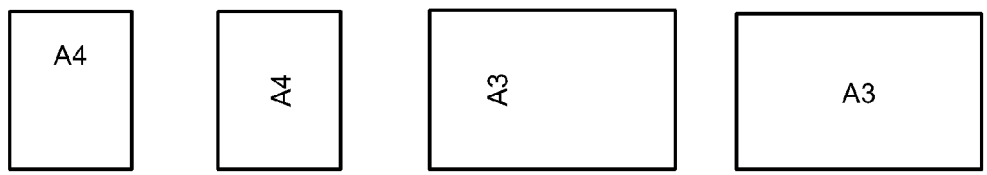
1600(b). PREVIEW IMAGE WITH SETTING OF "OPEN TO RIGHT"
1600(c). PREVIEW IMAGE WITH SETTING OF "OPEN TO TOP"
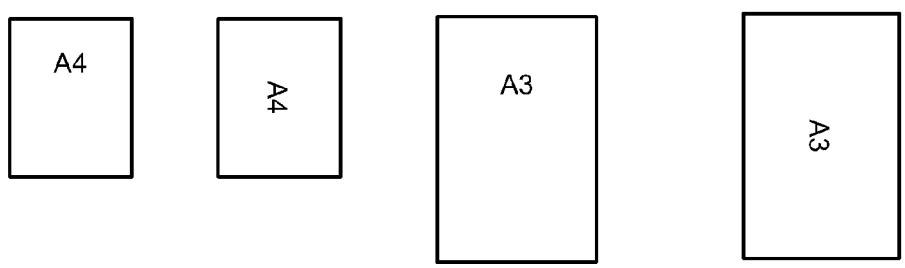

FIG.17
1700(o). FIRST PAGE IS SMALLER SIZE SHEET ARRANGED IN "LANDSCAPE" ORIENTATION
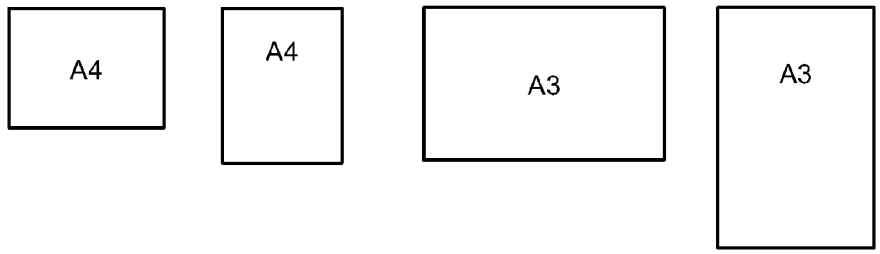
1700(a). PREVIEW IMAGE WITH SETTING OF "OPEN TO LEFT"
1700(b). PREVIEW IMAGE WITH SETTING OF "OPEN TO RIGHT"
1700(c). PREVIEW IMAGE WITH SETTING OF "OPEN TO TOP"
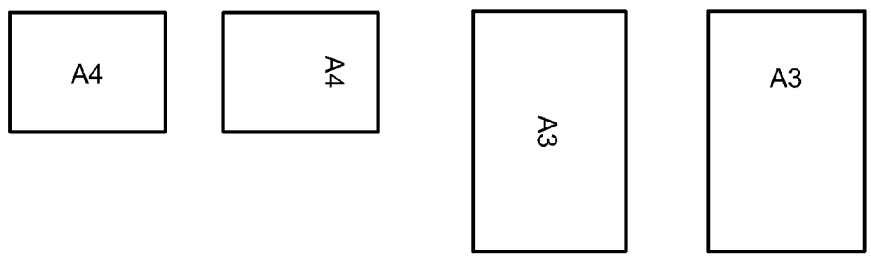

FIG.18
1800(o). FIRST PAGE IS LARGER SIZE SHEET ARRANGED IN "PORTRAIT" ORIENTATION
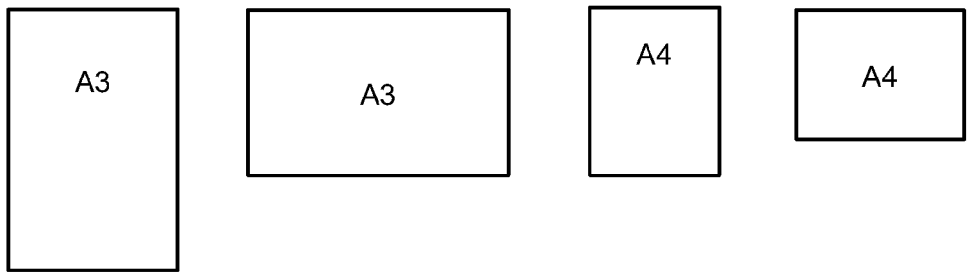
1800(a). PREVIEW IMAGE WITH SETTING OF "OPEN TO LEFT"
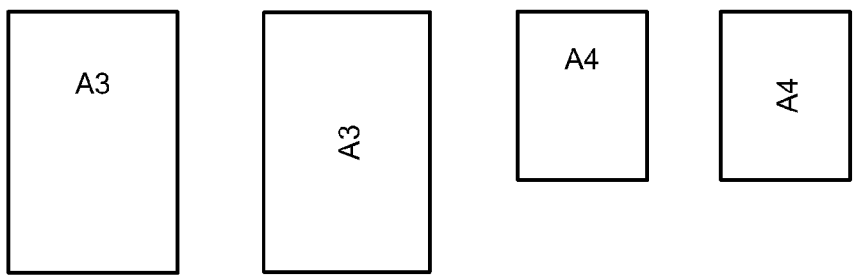
1800(b). PREVIEW IMAGE WITH SETTING OF "OPEN TO RIGHT"
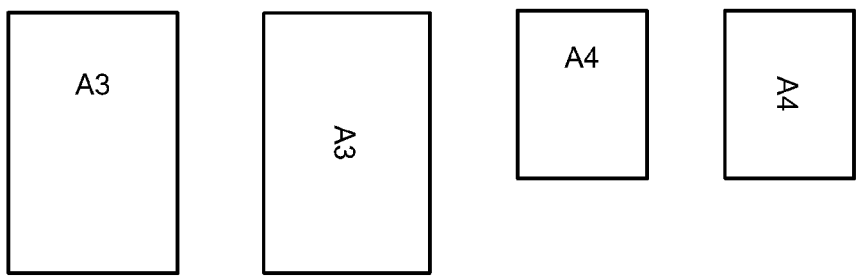
1800(c). PREVIEW IMAGE WITH SETTING OF "OPEN TO TOP"
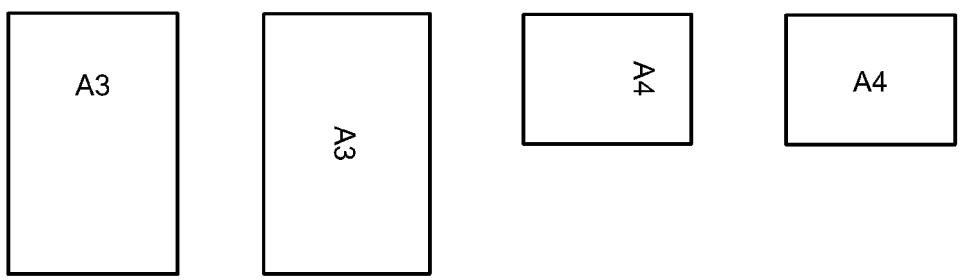

FIG.19
1900(o). FIRST PAGE IS LARGER SIZE SHEET ARRANGED IN "LANDSCAPE" ORIENTATION
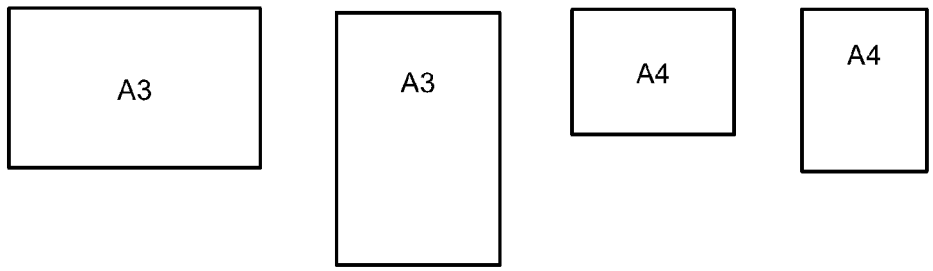
1900(a). PREVIEW IMAGE WITH SETTING OF "OPEN TO LEFT"
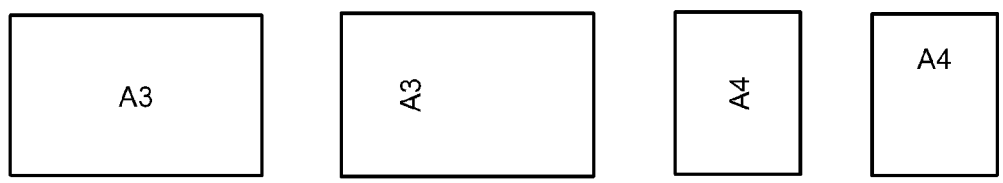
1900(b). PREVIEW IMAGE WITH SETTING OF "OPEN TO RIGHT"
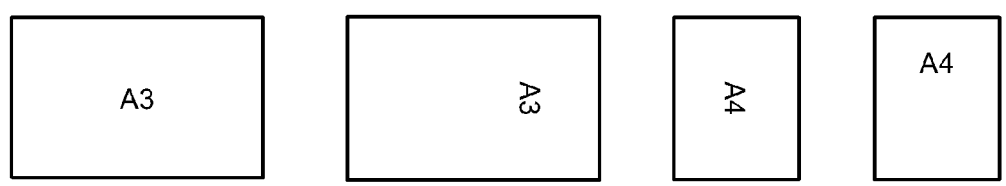
1900(c). PREVIEW IMAGE WITH SETTING OF "OPEN TO TOP"
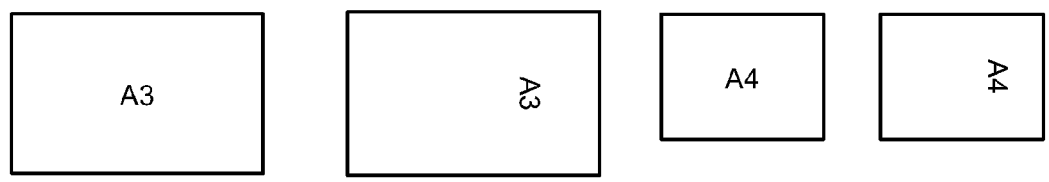

INFORMATION PROCESSING APPARATUS, COMPUTER PROGRAM PRODUCT, AND INFORMATION PROCESSING METHOD CONFIGURED TO ROTATE DOCUMENTS

CROSS-REFERENCE TO RELATED APPLICATIONS

The present application claims priority to and incorporates by reference the entire contents of Japanese Patent Application No. 2010-256845 filed in Japan on Nov. 17, 2010 and Japanese Patent Application No. 2011-226220 filed in Japan on Oct. 13, 2011.

BACKGROUND OF THE INVENTION

1. Field of the Invention

The present invention relates to an information processing apparatus, a computer program product, and information processing method.

2. Description of the Related Art

Image forming apparatuses, such as printers, provided with an application program that automatically rotates images on the basis of an orientation of an original of print data and an orientation of a pre-set sheet and prints the rotated images, are in widespread use. In duplex printing, the application rotates images on front and back sides of a sheet on the basis of a setting of a sheet open direction. When an online post processing apparatus for punching or stapling is connected to an image forming apparatus, the application rotates images on the basis of a position designated for post processing and an actual position of a mechanism of the post processing apparatus so that the post processing can be performed on the designated position.

There is a known technique for displaying a finished image as a preview screen in order to allow a user to check a positional relation between printing results on front and back sides of a sheet or a position where the post processing is to be performed, before printing is performed. For example, a technique has been proposed that displays, as an animation preview, a relation between images on front and back sides in duplex printing, so that a printing result can be grasped easily and accurately (see, for example, Japanese Patent Application Laid-open No. 2006-192580).

However, when originals of different sizes and different orientations (portrait and landscape) are mixed, it is difficult to accurately display a preview of a printing result with final post processing positions. In this case, even when the conventional preview technique is to be used with currently used application programs, it is necessary to prepare a rotation logic with respect to each printer model. Therefore, a general application program that is used in a variety of printers needs to have a plurality of rotation logics corresponding to the respective printer models, so that processes become cumbersome and complicated.

There is a need to provide an information processing apparatus and a computer program product capable of accurately and easily displaying a preview of a printing result even when sheets of different sizes are mixed in an original to be printed or even when post processing is set to be performed.

SUMMARY OF THE INVENTION

It is an object of the present invention to at least partially solve the problems in the conventional technology.

An information processing apparatus that is connected to an image forming apparatus includes: a size detecting unit that detects a size of each page of a document to be printed; an orientation detecting unit that detects orientation of each page of the document; a receiving unit that receives a setting of post processing that is to be performed on a printed sheet on which the document is printed; a determining unit that determines whether pages of different sizes, both having one side of the same length and other sides of different lengths, are detected in the document; a rotation control unit that, when the determining unit determines that the pages of the different sizes have been detected, rotates pages so that sides of the same length are aligned on the basis of the setting of the post processing received by the receiving unit; and an output unit that outputs the document with the pages rotated by the rotation control unit.

A computer program product includes a non-transitory computer-usable medium having computer-readable program codes embodied in the medium, wherein the program codes when executed causing a computer to execute: detecting a size of each page of a document to be printed; detecting orientation of each page of the document; receiving a setting of post processing that is to be performed on a printed sheet on which the document is printed; determining whether pages of different sizes, both having one side of the same length and other sides of different lengths, are detected in the document; rotating, when it is determined that the pages of the different sizes have been detected at the detecting the size, pages so that sides of the same length are aligned on the basis of the setting of the post processing received at the receiving; and outputting the document with the pages rotated at the rotating.

An information processing method for an information processing apparatus that is connected to an image forming apparatus includes: detecting a size of each page of a document to be printed; detecting orientation of each page of the document; receiving a setting of post processing that is to be performed on a printed sheet on which the document is printed; determining whether pages of different sizes, both having one side of the same length and other sides of different lengths, are detected in the document; rotating, when it is determined that the pages of the different sizes have been detected at the detecting the size, pages so that sides of the same length are aligned on the basis of the setting of the post processing received at the receiving; and outputting the document with the pages rotated at the rotating.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an exemplary combination of different sizes, both having one side of the same length;

FIG. 4 is a diagram illustrating various combinations of different sizes, both having one side of the same length;

FIG. 5 is a diagram illustrating a positional relation between front and back sides of a printing sheet in duplex printing;

FIG. 8A is a diagram illustrating an output example of a printer;

FIG. 8B is a diagram illustrating an output example of a printer;

FIG. 9 is a diagram illustrating exemplary page rotation performed by a rotation control unit;

FIG. 10 is a diagram illustrating an output example of an image forming apparatus;

FIG. 12 is a schematic diagram of a hardware configuration of the information processing apparatus;

FIG. 13 is a diagram for explaining exemplary page rotation that is performed when documents to be printed are of the same size;

FIG. 14 is a diagram for explaining exemplary page rotation that is performed when documents to be printed are of the same size;

FIG. 15 is a diagram illustrating an exemplary page rotation rule that is applied when pages of two different sizes are mixed in a document to be printed and the length of one side of a one of the two sizes is the same as the length of one side of the other one of the two sizes;

FIG. 16 is a diagram illustrating exemplary rotation that is performed when the first page is a smaller size sheet arranged in a portrait orientation;

FIG. 17 is a diagram illustrating exemplary rotation that is performed when the first page is a smaller size sheet arranged in a landscape orientation;

FIG. 18 is a diagram illustrating exemplary rotation that is performed when the first page is a larger size sheet arranged in a portrait orientation;

FIG. 19 is a diagram illustrating rotation exemplary rotation that is performed when the first page is a larger size sheet arranged in a landscape orientation.

DETAILED DESCRIPTION OF THE PREFERRED EMBODIMENTS

Exemplary embodiments of an information processing apparatus will be explained in detail below with reference to the accompanying drawings.

First Embodiment

Figure 1:
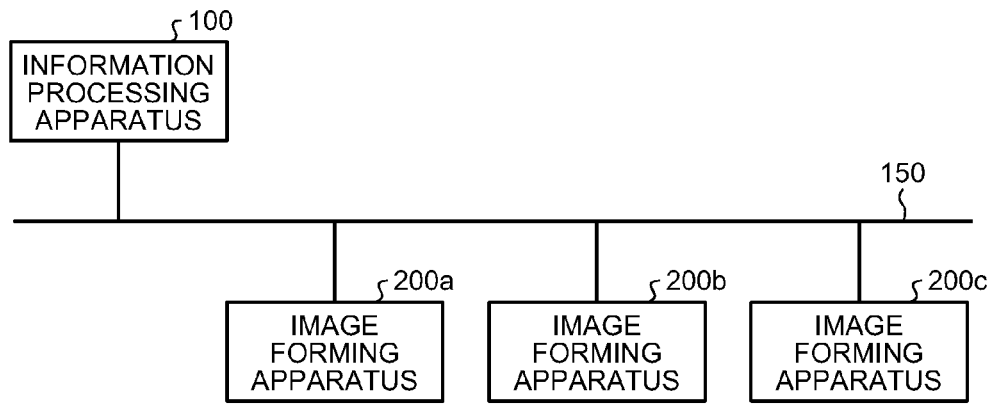
FIG. 1 is a block diagram of a configuration of a printing system according to a first embodiment.

FIG. 1 is a block diagram of a configuration of a printing system according to a first embodiment. As illustrated in FIG. 1, the printing system includes an information processing apparatus 100 that displays a preview of a printing result of a document to be printed; and image forming apparatuses 200a, 200b, and 200c (hereinafter, collectively described as an image forming apparatus 200), all of which are connected to one another via a network 150. The document to be printed includes text data and image data and is stored in the information processing apparatus 100 or is acquired from an external apparatus. The three image forming apparatuses 200 are illustrated in FIG. 1; however, the number of the image forming apparatuses is not limited to this and may be one or more than three.

The information processing apparatus 100 receives, from a user, printing conditions (duplex printing, color/monochrome, or the like) or settings of post processing (stapling, punching, or the like) that is performed on a printed sheet after printing. The information processing apparatus 100 rotates orientation of the document to be printed and transmits the rotated document and the post processing settings received from the user to the image forming apparatus 200 via the network 150.

The image forming apparatus 200 prints the document received from the information processing apparatus 100 while maintaining the orientation of the document as received. The image forming apparatus 200 performs the post processing received from the information processing apparatus 100 on the document. The post processing may be performed by an external post processing apparatus other than the image forming apparatus 200.

Figure 2:
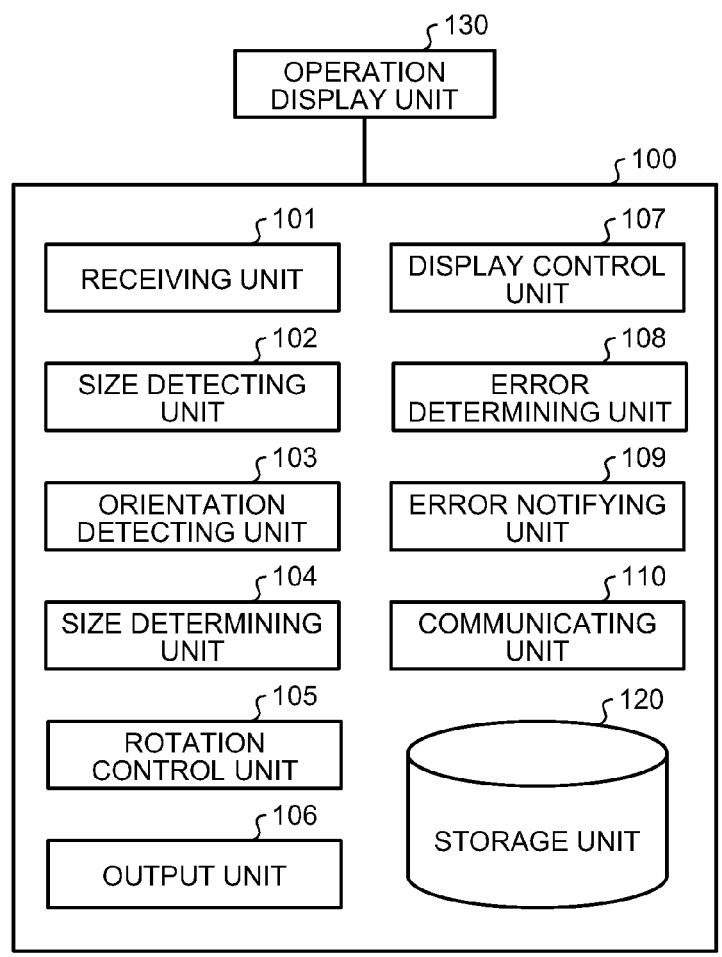
FIG. 2 is a block diagram of a functional configuration of an information processing apparatus.

A functional configuration of the information processing apparatus 100 will be explained in detail below. FIG. 2 is a block diagram of the functional configuration of the information processing apparatus 100.

As illustrated in FIG. 2, the information processing apparatus 100 mainly includes a receiving unit 101; a size detecting unit 102; an orientation detecting unit 103; a size determining unit 104; a rotation control unit 105; an output unit 106; a display control unit 107; an error determining unit 108; an error notifying unit 109; a communicating unit 110; an operation display unit 130; and a storage unit 120.

The storage unit 120 stores therein a document generated by the information processing apparatus 100 or a document acquired from an external apparatus or a recording medium (not illustrated). The storage unit 120 also stores therein a rule for determining a page rotation direction, a rule for determining availability of a post processing setting, or the like as described below.

The operation display unit 130 displays various screens. For example, the operation display unit 130 displays a display screen that allows for selection of a document to be printed or selection of a post processing setting. The post processing setting indicates processing, such as duplex printing, punching, or stapling that is performed on a printed sheet after printing. The duplex printing is generally selected and set as a printing condition; however, according to the embodiment, the duplex printing is included in the post processing seeing for convenience of explanation.

The receiving unit 101 receives selection of a document to be printed. The document to be printed may be stored in the storage unit 120 or may be acquired from an external apparatus or a recording medium (not illustrated). The receiving unit 101 also receives the post processing setting that is input to the operation display unit 130 by the user.

The size detecting unit 102 detects a size of each page of the document, the selection of which is received by the receiving unit 101. For example, the size detecting unit 102 may detect the size of each page by acquiring page setting information added to the document. The page setting information is information containing a page number, a page size, a page orientation, and the like.

The orientation detecting unit 103 detects the orientation of each page of the document, the selection of which is received by the receiving unit 101. For example, the orientation detecting unit 103 may detect the orientation of each page by acquiring the page setting information added to the document.

The size determining unit 104 determines whether the size detecting unit 102 has detected, from the document, a plurality of pages of different sizes, both having one side of the same length and the other sides of different lengths. For example, the size determining unit 104 determines whether the pages of the different sizes detected by the size detecting unit 102 correspond to any of combinations that are stored in advance in the storage unit 120 as the combinations of different sizes both having one side of the same length.

FIG. 3 is a diagram illustrating an exemplary combination of different sizes, both having one side of the same length. As illustrated in FIGS. 3, A4 and A3 make a combination of different sizes, both having one side of the same length. A4 indicates a size that is smaller than A3. A long side of A4 that has sides of different lengths has the same length as a short side of A3 that has sides of different lengths. FIG. 4 is a diagram illustrating various combinations of different sizes, both having one side of the same length. In FIG. 4, the combinations of different sizes, both having one side of the same length and other sides of different lengths, are indicated by item numbers 1 to 4. For example, the item number 1 indicates a combination of A4 and A3 as illustrated in FIG. 3, and the item number 2 indicates a combination of B5 and B4.

When the size determining unit 104 determines that the different sizes both having one side of the same length are detected from the document, the rotation control unit 105 rotates pages of the document so that the sides of the same lengths are aligned between the pages of the different sizes, on the basis of the received post processing setting. For example, the rotation control unit 105 rotates the pages in accordance with a rule for determining a rotation direction. The rule for determining a rotation direction is a rule that determines the rotation direction on the basis of a page size, a page orientation, and contents of the post processing setting (open to left/right, open to top/bottom, or the like). The rule for determining a rotation direction can be changed appropriately for each printer. Therefore, if a relation between front and back sides of a page is definite, a printing result can be obtained by a simple logic (e.g., by rotating only pages in portrait orientations or by rotating only A3 size pages).

The page rotation direction determined by the rotation control unit 105 will be explained below by comparison with a conventional page rotation direction. Explanation is first given of a positional relation between front and back sides of a printing sheet, on which each page of the document is to be printed, on the assumption that the receiving unit 101 receives, for example, settings of duplex printing and punching as the post processing settings.

FIG. 5 is a diagram illustrating the positional relation between the front side, back side, and center A of a printing sheet in duplex printing. A surface indicated by an arrow on the front side is a front side of the printing sheet and a surface indicated by an arrow on the back side is a back side of the printing sheet.

Figure 6:
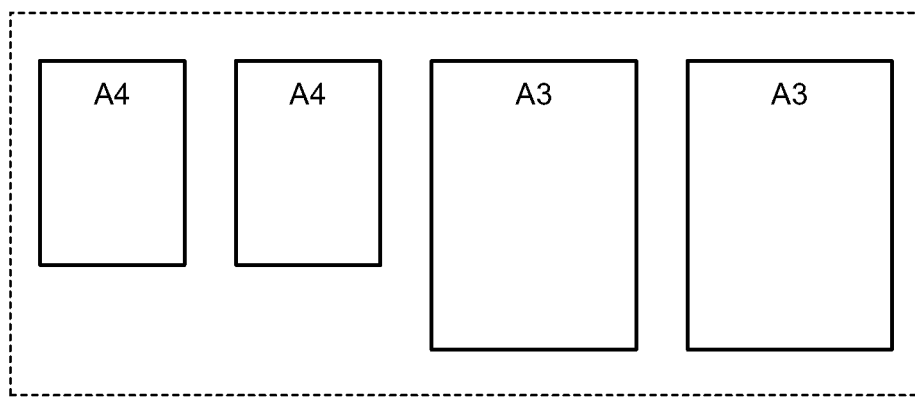
FIG. 6 is a diagram illustrating documents arranged according to page numbers.

FIG. 6 is a diagram illustrating documents arranged according to page numbers. In FIG. 6, the first page and the second page are of A4 sizes and the third page and the fourth page are of A3 sizes. In FIG. 6, the receiving unit 101 has received duplex printing, open to left/right, and left punching, as the post processing settings.

Figure 7:
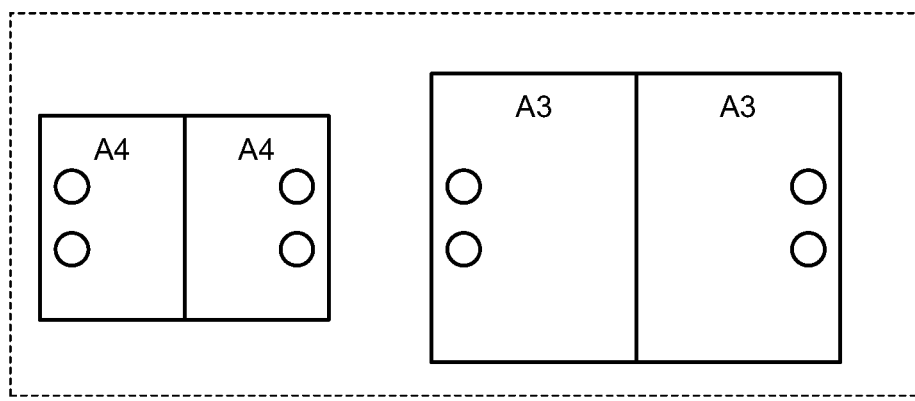
FIG. 7 is a diagram illustrating a conventional type of preview screen.

FIG. 7 is a diagram illustrating a conventional type of preview screen. In FIG. 7, presence of the post processing settings is indicated on the documents illustrated in FIG. 6 while page rotation that is performed before the post processing is not reflected.

FIG. 8A is a diagram illustrating an output example of a printer A. FIG. 8B is a diagram illustrating an output example of a printer B that is different from the printer A. In FIGS. 8A and 8B, A4 size pages are printed on two respective sides of the first printing sheet and A3 size pages are printed on two respective sides of the second printing sheet. When the output of the A3 size pages on the second printing sheet is focused on, the two A3 size pages are arranged in the same orientation on the second printing sheet in the output of the printer A as illustrated in FIG. 8A.

In the case illustrated in FIG. 8A, the two A3 size pages as illustrated in FIG. 7 are rotated to the left by 90°. This is because, although the reason may depend on the specification of a post processing apparatus connected to the printer, most printers employ short edge feed for A3 sheets and have a mechanism that aligns lateral sides with respect to the sheet conveying direction when different sheet sizes, such as A3 and A4, are mixed. In this case, if the post processing setting is not made, it is not necessary to reflect a conveying direction or a feed direction of a printing sheet to the preview screen. However, if the post processing setting is made while different sheet sizes are mixed, mismatching between the preview image and an actual printing output is likely to occur.

On the other hand, as illustrated in FIG. 8B, the two A3 size pages are arranged in different orientations on the second printing sheet in the output of the printer B. In the case illustrated in FIG. 8B, the first page of the A3 size pages illustrated in FIG. 7 is rotated to the left by 90° while the second page is rotated to the right by 90°, which is different from the case illustrated in FIG. 8A.

Specifically, in the conventional technology, there is a case that the same preview image as illustrated in FIG. 7 is displayed both when the output of the printer is arranged as illustrated in FIG. 8A and when the output of the printer is arranged as illustrated in FIG. 8B. If priority is given to turning sheets about the position punched by the post processing, the front and back sides of a sheet are printed so that they are opened to top as illustrated in FIG. 8A; and, if priority is given to open to left/right, the pages are printed in the arrangement as illustrated in FIG. 8B. Furthermore, which arrangement is employed in printing is determined mostly depending on the implementation of a printer. Therefore, output may become different depending on a printer model. As described above, it has been extremely difficult to acquire printer properties that vary depending on a printer model and to reflect the properties to the preview before printing is performed.

FIG. 9 is a diagram illustrating exemplary page rotation performed by the rotation control unit 105 according to the first embodiment. The rotation control unit 105 rotates the pages of the document illustrated in FIG. 6 in accordance with the rule for determining a rotation direction. In FIG. 9, the rotation control unit 105 rotates the two A3 size pages, which are arranged in portrait orientations, to the left by 90°, so that the pages are arranged in the landscape orientations. It is sufficient that the page rotation direction used by the rotation control unit 105 is determined as a system; therefore, the page rotation direction is not necessarily the same as the rotation direction of the printer. As described above, when the post processing settings are added to the rotated pages and then the printing is performed, it becomes possible to obtain the same printing result by any printers regardless of the rotation direction that is determined in accordance with the specification of the printer.

The output unit 106 displays a preview screen of the document with the pages rotated by the rotation control unit 105 on the operation display unit 130 via the display control unit 107. The output unit 106 transmits the pages rotated by the rotation control unit 105 and a printing instruction to the image forming apparatus 200 via the communicating unit 110.

Upon receiving the pages and the printing instruction, the image forming apparatus 200 outputs the pages received from the output unit 106 in the order in which the pages are received. As illustrated in FIG. 10, the image forming apparatus 200 punches the pages in the order in which the pages are received from the output unit 106, on the sides where the first A4 page and the second A3 page have the same length.

The error determining unit 108 determines whether the post processing setting received by the receiving unit 101 is available in relation to the page size or the page orientation, and determines that there is an error when a post processing setting that is determined as unavailable is set. For example, the error determining unit 108 determines the availability of the post processing setting in accordance with a rule for determining availability of a post processing setting, thereby determining whether there is an error. For example, the rule for determining availability of a post processing setting determines that a post processing setting for open to top/bottom is not available when the first page is of a small size and arranged in a portrait orientation in the combination of pages of a small size and pages of a large size. The contents of the rule for determining availability of a post processing setting can be changed appropriately depending on the specification of the printer.

When the error determining unit 108 determines that there is an error, the error notifying unit 109 notifies a user that the post processing setting received by the receiving unit 101 is not available. For example, when the error determining unit 108 determines that there is an error, the error notifying unit 109 displays the error on the operation display unit 130 via the display control unit 107.

The display control unit 107 displays various screens and messages on the operation display unit 130. For example, the display control unit 107 displays a preview screen according to an instruction by the output unit 106 or an error according to an instruction by the error notifying unit 109.

The communicating unit 110 transmits and receives various types of information between the information processing apparatus 100 and the image forming apparatus 200. For example, the communicating unit 110 transmits the pages, which are rotated by the rotation control unit 105 and sent from the output unit 106, to the image forming apparatus 200 together with the printing instruction.

Figure 11:
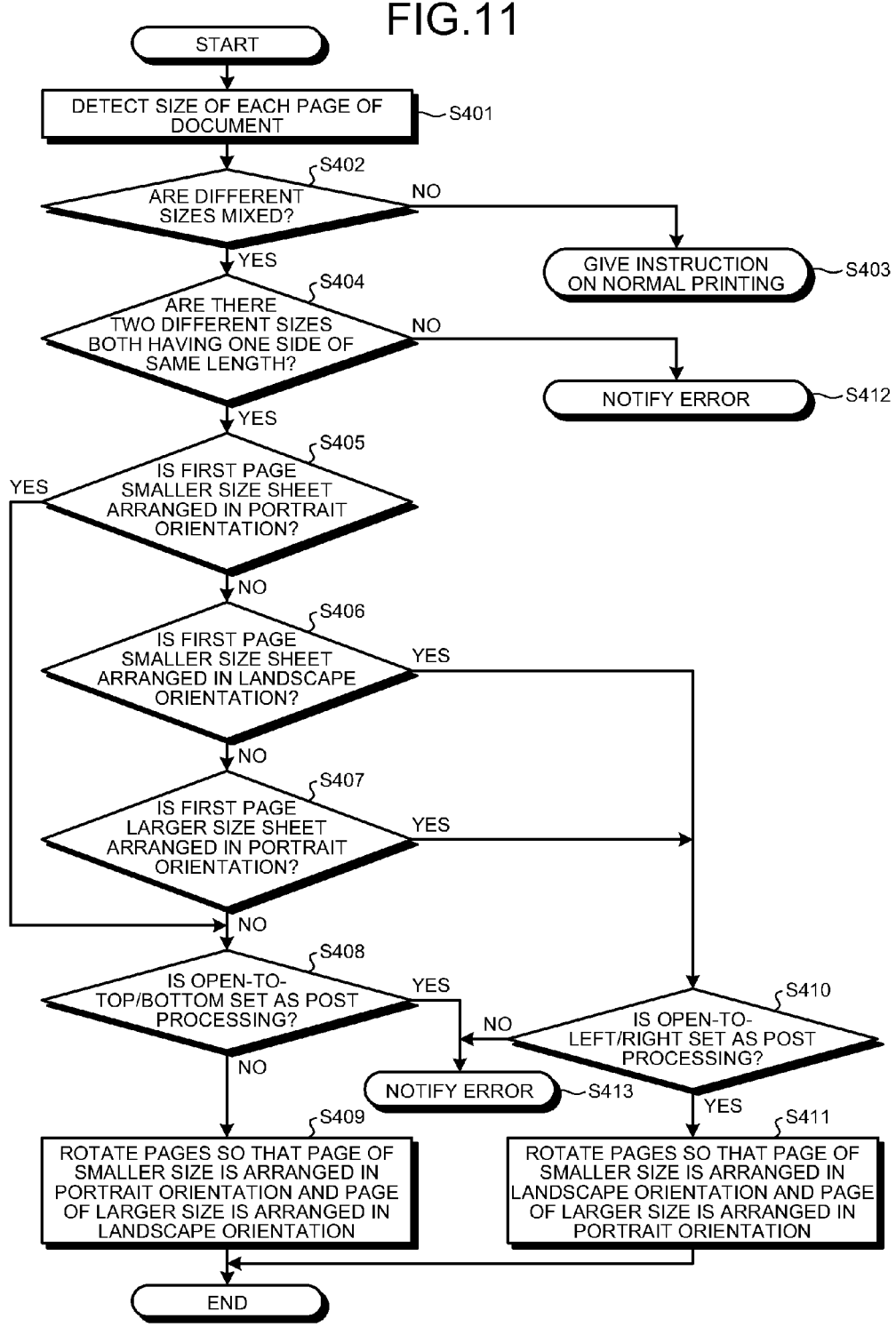
FIG. 11 is a flowchart of a procedure of a page rotation process performed by the information processing apparatus.

A page rotation process performed by the information processing apparatus 100 configured as above will be explained below, in which pages of a document to be printed are rotated. FIG. 11 is a flowchart of a procedure of the page rotation process performed by the information processing apparatus 100.

The size detecting unit 102 detects a size of each page of the document to be printed (Step S401). The size determining unit 104 determines whether pages of different sizes are mixed in the document to be printed (Step S402).

When the size determining unit 104 determines that pages of different sizes are not mixed in the document to be printed (NO at Step S402), the output unit 106 transmits the document to the image forming apparatus 200 via the communicating unit 110 and gives an instruction on normal printing (Step S403). In this case, when, for example, pages of different sizes are mixed in the document but there is a setting for performing printing in a uniform size, the output unit 106 gives an instruction on normal printing with the post processing setting similarly to the above.

When the size determining unit 104 determines that pages of different sizes are mixed in the document to be printed (YES at Step S402), the size determining unit 104 determines whether there are two different sizes and the length of one side of one of the two sizes is the same as the length of one side of the other one of the two sizes (Step S404). In this case, even when, for example, there are three or more different sizes or when there are two sizes but there are no sides of the same length like in the combination of A4 and B4 for example, if the post processing setting is available, the error determining unit 108 may determine that the post processing setting is available.

When the size determining unit 104 does not determine that there are two different sizes and the length of one side of one of the two sizes is the same as the length of one side of the other one of the two sizes (NO at Step S404), the error notifying unit 109 notifies an error (Step S412). Therefore, when there are two different sizes but the length of one side of one of the two sizes is not the same as the length of one side of the other one of the two sizes, it is possible to instruct a user not to set a post processing, such as punching or stapling.

When the size determining unit 104 determines that there are two different sizes and the length of one side of one of the two sizes is the same as the length of one side of the other one of the two sizes (YES at Step S404), the error notifying unit 109 determines whether the first page of the document is of a smaller size than the other size and arranged in a portrait orientation (Step S405).

When it is determined that the first page of the document is of the smaller size than the other size and arranged in the portrait orientation (YES at Step S405), the rotation control unit 105 determines whether open to top/bottom is set as the post processing (Step S408). When the rotation control unit 105 determines that open to top/bottom is set as the post processing (YES at Step S408), the error notifying unit 109 notifies an error (Step S413).

When the rotation control unit 105 determines that the open to top/bottom is not set as the post processing (NO at Step S408), the rotation control unit 105 rotates each page such that a page of the smaller size than the other size is arranged in the portrait orientation and a page of the larger size is arranged in the landscape orientation (Step S409).

The rotation control unit 105 performs the above determination on the basis of the rule for determining a page rotation direction. According to the flowchart of the first embodiment, the rotation control unit 105 refers to the size of the first page as a determination criterion because many of printers determine a page printing operation on the basis of the size and the orientation of the first page. However, the present invention is not limited to this example.

At Step S405, when the rotation control unit 105 does not determine that the first page of the document is of a smaller size than the other size and arranged in the portrait orientation (NO at Step S405), the rotation control unit 105 determines whether the first page is of a smaller size than the other size and arranged in the landscape orientation (Step S406).

When the rotation control unit 105 does not determine that the first page is of a smaller size than the other size and arranged in the landscape orientation (NO at Step S406), the rotation control unit 105 determines whether the first page is of a larger size than the other size and arranged in the portrait orientation (Step S407).

When the rotation control unit 105 does not determine that the first page is of a larger size than the other size and arranged in the portrait orientation (NO at Step S407), process control proceeds to Step S409.

On the other hand, when, at Step S406, the rotation control unit 105 determines that the first page is of a smaller size than the other size and arranged in the landscape orientation (YES at Step S406), or, when, at Step S407, the rotation control unit 105 determines that the first page is of a larger size than the other size and arranged in the portrait orientation (YES at Step S407), the rotation control unit 105 determines whether open-to-left or open-to-right is set as the post processing (Step S410). And if the open-to-left or open-to-right is set as the post processing (Yes at Step 410), then the rotation control unit 105 rotates each page such that a page of the smaller size than the other size is arranged in the landscape orientation and a page of the larger size is arranged in the portrait orientation (Step S411).

As described above, according to the first embodiment, pages are rotated on the basis of the size and the orientation of a page of the document to be printed and a direction set by the post processing setting, so that even when sheets of different sizes are mixed in an original to be printed or even when post processing is set, it is possible to accurately and easily preview a printing result.

Furthermore, according to the first embodiment, because pages are rotated on the basis of the size and the orientation of a page of the document to be printed and a direction set by the post processing setting, even when a different rotation direction is set to each printer, it is possible to exclude performing page rotation based on a method specific to the printer.

Moreover, according to the first embodiment, the error determining unit 108 determines the post processing that can be set in relation to the size and the orientation of a page of the document to be printed. Therefore, it is possible to cancel any post processing that is set based on a predetermined condition, enabling to prevent a printing failure.

A hardware configuration of the information processing apparatus 100 according to the first embodiment will be explained with reference to FIG. 12. FIG. 12 is a schematic diagram of the hardware configuration of the information processing apparatus 100 according to the first embodiment.

The information processing apparatus 100 according to the first embodiment includes a control device, such as a central processing unit (CPU) 151; a storage device, such as a read only memory (ROM) 152 and a random access memory (RAM) 153; a communication I/F 154 that performs communication through connection with the network; an external storage device, such as a hard disk drive (HDD) and a compact disc (CD) drive device; a display device such as a display; an input device, such as a keyboard and a mouse; and a bus 161 that connects the above units. The information processing apparatus 100 has the hardware configuration using a normal computer.

A page rotation control program, implemented by the information processing apparatus 100 according to the first embodiment, is stored in a computer-readable recording medium, such as a compact disk read only memory (CD-ROM), a flexible disk (FD), a compact disk recordable (CD-R), and a digital versatile disk (DVD), in an installable or an executable format, and is provided as a computer program product.

The page rotation control program implemented by the information processing apparatus 100 according to the first embodiment may be stored in a computer connected to a network, such as the Internet, such that the program is provided by being downloaded via the network. The page rotation control program implemented by the information processing apparatus 100 according to the first embodiment may also be configured so that the program can be provided or distributed via a network, such as the Internet.

The page rotation control program according to the first embodiment may be configured so that the program is provided by being built in a ROM or the like in advance.

The page rotation control program implemented by the information processing apparatus 100 according to the first embodiment has a module structure made up of the above units (the receiving unit, the size detecting unit, the orientation detecting unit, the size determining unit, the rotation control unit, the output unit, the display control unit, the error determining unit, the error notifying unit, and the communicating unit). As actual hardware, the CPU 151 (processor) reads the page rotation control program from the above recording medium and executes the program to load the above units on a main storage device, so that the above units are generated on the main storage device.

Second Embodiment

A second embodiment will be explained below. The same components as those of the first embodiment described above are denoted by the same reference codes, and explanation thereof will be omitted appropriately.

In the second embodiment, when it is determined that pages of two different sizes are mixed in a document to be printed and a length of one side of one of the two sizes is the same as a length of one side of the other one of the two sizes, and when the post processing setting received by the receiving unit 101 is available, the rotation control unit 105 rotates the second and later pages on the basis of the post processing setting such that sides of the same lengths are aligned. On the other hand, when the post processing setting received by the receiving unit 101 is not available, the rotation control unit 105 rotates the second and later pages such that pages contained in the document are arranged in the same orientation as that of the first page (top page). When all pages contained in the document to be printed are of the same size, the rotation control unit 105 rotates the second and later pages on the basis of the received post processing setting such that the second and later pages are arranged in the same orientation as that of the first page (top page). Concrete examples of the above will be explained below.

An example will be explained in which page rotation is performed when all pages contained in a document to be printed are of the same size. For example, as illustrated in a case 1300(0) in FIG. 13, it is assumed that the first page is arranged in the portrait orientation ("portrait") and the second page is arranged in the landscape orientation ("landscape"). In this case, the rotation control unit 105 rotates the second page on the basis of the received post processing setting so that the second page is arranged in the portrait orientation. According to the second embodiment, when the received post processing setting indicates stapling or punching, the rotation control unit 105 rotates a page such that a top side or a left side of an image on the page viewed from the front side is opposed to a side to be bound among the sides of the page. More specifically, as illustrated in a case 1300(a), when "open to left" is set as the post processing setting, the rotation control unit 105 rotates the second page, which having been arranged in the landscape orientation to the left by 90°, so that the second page is arranged in the portrait orientation. As illustrated in a case 1300(b), when "open to right" is set as the post processing setting, the rotation control unit 105 rotates the second page having been arranged in the landscape orientation to the right by 90°, so that the second page is arranged in the portrait orientation. As illustrated in a case 1300(c), when "open to top" is set as the post processing setting, the rotation control unit 105 rotates the second page having been arranged in the landscape orientation to the right by 90°, so that the second page is arranged in the portrait orientation.

As illustrated in a case 1400(0) in FIG. 14, it is assumed that the first page is arranged in the landscape orientation and the second page is arranged in the portrait orientation. In this case, the rotation control unit 105 rotates the second page on the basis of the received post processing setting such that the second page is arranged in the landscape orientation. More specifically, as illustrated in a case 1400(a), when "open to left" is set as the post processing setting, the rotation control unit 105 rotates the second page having been arranged in the portrait orientation to the left by 90°, so that the second pages is arranged in the landscape orientation. As illustrated in a case 1400(*b*), when "open to right" is set as the post processing setting, the rotation control unit 105 rotates the second page having been arranged in the portrait orientation to the right by 90°, so that the second pages is arranged in the landscape orientation. As illustrated in a case 1400(*c*), when "open to top" is set as the post processing setting, the rotation control unit 105 rotates the second page having been arranged in the portrait orientation to the right by 90°, so that the second pages is arranged in the landscape orientation.

Another example will be explained in which page rotation is performed when the document to be printed is made up of pages of two different sizes and a length of one side of one of the two sizes is the same as a length of one side of the other one of the two sizes. In this case, the rotation control unit 105 rotates the second and later pages on the basis of the post processing setting so that the sides of the same lengths are aligned.

FIG. 15 is a diagram illustrating an exemplary rotation rule of this case. As illustrated in FIG. 15, when the first page is a smaller size sheet arranged in the portrait orientation, available post processing is "open to left" and "open to right". In this case, the rotation control unit 105 rotates the second and later pages such that a smaller size sheet is arranged in the portrait orientation and a larger size sheet is arranged in the landscape orientation. The page rotation direction for the second and later pages is a direction that is set according to the post processing setting. When the first page is a smaller size sheet arranged in the landscape orientation, available post processing is "open to top". In this case, the rotation control unit 105 rotates the second and later pages such that a smaller size sheet is arranged in the landscape orientation and a larger size sheet is arranged in the portrait orientation. When the first page is a larger size sheet arranged in the portrait orientation, available post processing is "open to top". In this case, the rotation control unit 105 rotates the second and later pages such that a smaller size sheet is arranged in the landscape orientation and a larger size sheet is arranged in the portrait orientation. When the first page is a larger size sheet arranged in the landscape orientation, available post processing is "open to left" and "open to right". In this case, the rotation control unit 105 rotates the second and later pages such that a smaller size sheet is arranged in the portrait orientation and a larger size sheet is arranged in the landscape orientation.

As illustrated in FIG. 16, it is assumed that the first page is a smaller size sheet arranged in the portrait orientation. In the example illustrated in FIG. 16, the second page is a smaller size sheet arranged in the landscape orientation, the third page is a larger size sheet arranged in the portrait orientation, and the fourth page is a larger size sheet arranged in the landscape orientation.

As can be seen also from FIG. 15, when the first page is a smaller size sheet arranged in the portrait orientation, "open to left" or "open to right" can be set as available post processing but "open to top" cannot be set. When "open to left" is set as the post processing, as illustrated in a case 1600(*a*) in FIG. 16, the rotation control unit 105 rotates the second and later pages such that a smaller size sheet is arranged in the portrait orientation and a larger size sheet is arranged in the landscape orientation. The rotation direction in this case is a direction that is set according to "open to left". More specifically, the rotation control unit 105 rotates the second page to the left by 90° to arrange the second page in the portrait orientation. The rotation control unit 105 rotates the third page to the left by 90° to arrange the third page in the landscape orientation. The fourth page is not rotated in this example because the fourth page is already arranged in the landscape orientation.

When "open to right" is set as the post processing, as illustrated in a case 1600(*b*), the rotation control unit 105 rotates the second and later pages such that a smaller size sheet is arranged in the portrait orientation and a larger size sheet is arranged in the landscape orientation. The rotation direction in this case is a direction that is set according to "open to right". More specifically, the rotation control unit 105 rotates the second page to the right by 90° to arrange the second page in the portrait orientation. The rotation control unit 105 rotates the third page to the left by 90° to arrange the third page in the landscape orientation. The fourth page is not rotated in this example because the fourth page is already arranged in the landscape orientation.

When "open to top" is set as the post processing, the rotation control unit 105 rotates the second and later pages such that the second and later pages are arranged in the same orientation as that of the first page. More specifically, as illustrated in a case 1600(*c*), the rotation control unit 105 rotates the second and later pages such that the second and later pages are arranged in the portrait orientation.

As illustrated in FIG. 17, it is assumed that the first page is a smaller size sheet arranged in the landscape orientation. In the example illustrated in FIG. 17, the second pages is a smaller size sheet arranged in the portrait orientation, the third sheet is a larger size sheet arranged in the landscape orientation, and the fourth page is a larger size sheet arranged in the portrait orientation.

As can be seen from FIG. 15, when the first page is a smaller size sheet arranged in the landscape orientation, "open to top" can be set as available post processing but "open to left" and "open to right" cannot be set. When "open to left" or "open to right" is set as the post processing, the rotation control unit 105 rotates the second and later pages such that the second and later pages are arranged in the same orientation as that of the first page. More specifically, as illustrated in a cases 1700(*a*) and 1700(*b*) in FIG. 17, the rotation control unit 105 rotates the second and later pages such that the second and later pages are arranged in the landscape orientation.

When "open to top" is set as the post processing setting, as illustrated in a case 1700(*c*), the rotation control unit 105 rotates the second and later pages such that a smaller size sheet is arranged in the landscape orientation and a larger size sheet is arranged in the portrait orientation. The rotation direction in this case is a direction that is set according to "open to top". More specifically, the rotation control unit 105 rotates the second page to the right by 90° to arrange the second page in the landscape orientation. The rotation control unit 105 rotates the third page to the right by 90° to arrange the third page in the portrait orientation. The fourth page is not rotated in this example because the fourth page is already arranged in the portrait orientation.

As illustrated in FIG. 18, it is assumed that the first page is a larger size sheet arranged in the portrait orientation. In the example illustrated in FIG. 18, the second page is a larger size sheet arranged in the landscape orientation, the third page is a smaller size sheet arranged in the portrait orientation, and the fourth page is a smaller size sheet arranged in the landscape orientation.

As can be seen from FIG. 15, when the first pages is a larger size sheet arranged in the portrait orientation, "open to top" can be set as available post processing but "open to left" and "open to right" cannot be set. When "open to left" or "open to right" is set as the post processing, the rotation control unit 105 rotates the second and later pages such that the second and later pages are arranged in the same orientation as that of the first page. More specifically, as illustrated in a case 1800

(a) and 1800(b) in FIG. 18, the rotation control unit 105 rotates the second and later pages such that the second and later pages are arranged in the portrait orientation.

When "open to top" is set as the post processing setting, as illustrated in a case 1800(C), the rotation control unit 105 rotates the second and later pages such that a smaller size sheet is arranged in the landscape orientation and a larger size sheet is arranged in the portrait orientation. The rotation direction in this case is a direction that is set according to "open to top". More specifically, the rotation control unit 105 rotates the second page to the right by 90° to arrange the second page in the portrait orientation. The rotation control unit 105 rotates the third page to the right by 90° to arrange the third page in the landscape orientation. The fourth page is not rotated in this example because the fourth page is already arranged in the landscape orientation.

As illustrated in FIG. 19, it is assumed that the first page is a larger size sheet arranged in the landscape orientation. In the example illustrated in FIG. 19, the second page is a larger size sheet arranged in the portrait orientation, the third page is a smaller size sheet arranged in the landscape orientation, and the fourth page is a smaller size sheet arranged in the portrait orientation.

As can be seen from FIG. 15, when the first page is a larger size sheet arranged in the landscape orientation, "open to left" and "open to right" can be set as available post processing settings but "open to top" cannot be set. When "open to left" is set as the post processing, as illustrated in a case 1900(a) in FIG. 19, the rotation control unit 105 rotates the second and later pages such that a smaller size sheet is arranged in the portrait orientation and a larger size sheet is arranged in the landscape orientation. The rotation direction in this case is a direction that is set according to "open to left". More specifically, the rotation control unit 105 rotates the second page to the left by 90° to arrange the second page in the landscape orientation. The rotation control unit 105 rotates the third page to the left by 90° to arrange the second page in the portrait orientation. The fourth page is not rotated in this example because the fourth page is already arranged in the portrait orientation.

When "open to right" is set as the post processing setting, as illustrated in a case 1900(b), the rotation control unit 105 rotates the second and later pages such that a smaller size sheet is arranged in the portrait orientation and a larger size sheet is arranged in the landscape orientation. The rotation direction in this case is a direction that is set according to "open to right". More specifically, the rotation control unit 105 rotates the second page to the right by 90° to arrange the second page in the landscape orientation. The rotation control unit 105 rotates the third page to the right by 90° to arrange the third page in the portrait orientation. The fourth page is not rotated in this example because the fourth page is already arranged in the portrait orientation.

When "open to top" is set as the post processing setting, the rotation control unit 105 rotates the second and later pages such that the second or later pages are arranged in the same orientation as that of the first page. More specifically, as illustrated in a case 1900(c), the rotation control unit 105 rotates the second and later pages such that the second or later pages are arranged in the landscape orientation.

Figure 20:
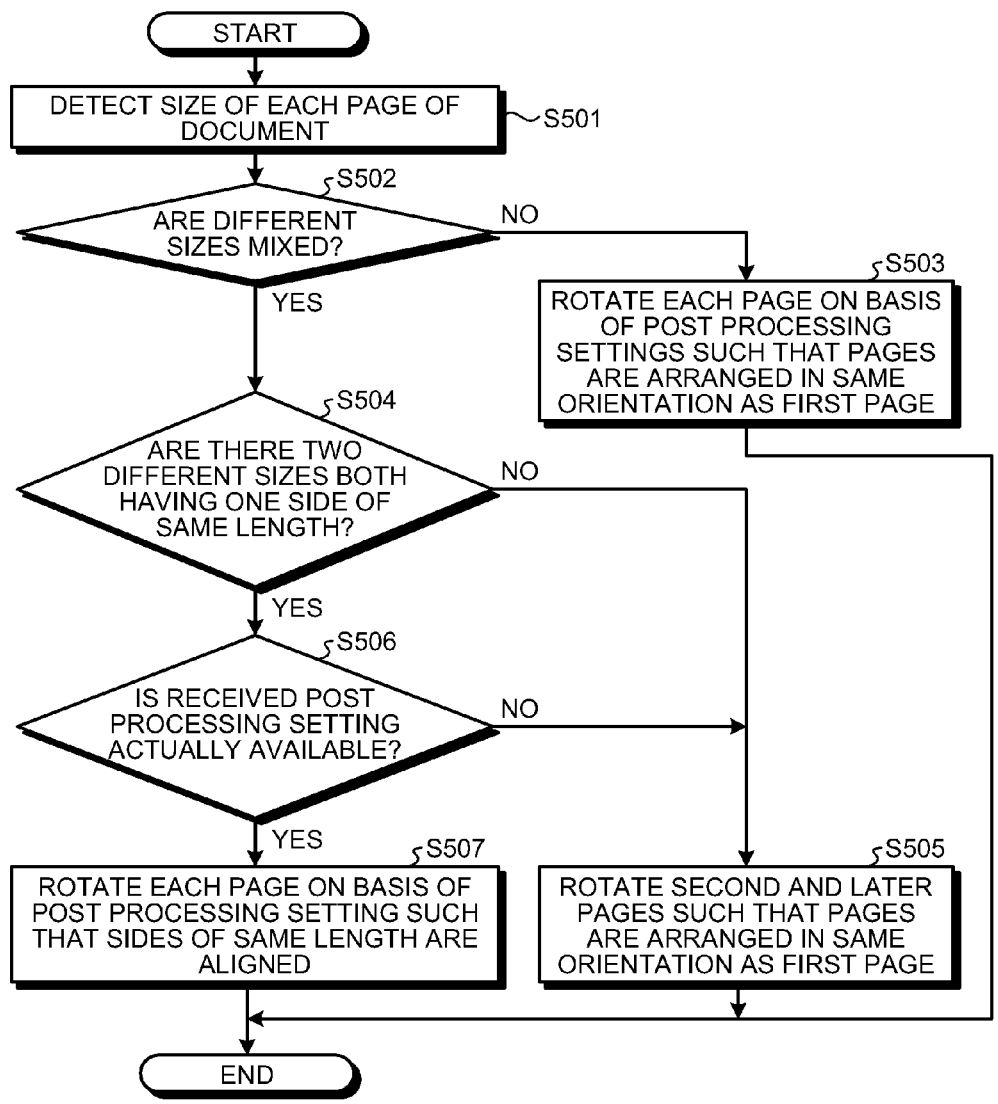
FIG. 20 is a flowchart of a procedure of a page rotation process performed by an information processing apparatus according to a second embodiment.

FIG. 20 is a flowchart of an exemplary procedure of the page rotation process performed by the information processing apparatus according to the second embodiment. As illustrated in FIG. 20, the size detecting unit 102 detects a size of each page of a document to be printed (Step S501). The size determining unit 104 determines whether pages of different sizes are mixed in the document to be printed (Step S502).

When the size determining unit 104 determines that there are no pages of different sizes that are mixed therein (NO at Step S502), that is, when the size determining unit 104 determines that all pages contained in the document to be printed are of the same size, the rotation control unit 105 rotates each page on the basis of the received post processing setting such that the second and later pages are arranged in the same orientation as that of the first page as described above (Step S503).

On the other hand, when the size determining unit 104 determines that pages of different sizes are mixed (YES at Step S502), the size determining unit 104 determines whether there are two different sizes and the length of one side of one of the two sizes is the same as the length of one side of the other one of the two sizes (Step S504).

When it is not determined that there are two different sizes and the length of one side of one of the two sizes is the same as the length of one side of the other one of the two sizes (NO at Step S504), the rotation control unit 105 rotates each page such that the second and later pages are arranged in the same orientation as that of the first page (Step S505).

On the other hand, when it is determined that there are two different sizes and the length of one side of one of the two sizes is the same as the length of one side of the other one of the two sizes (YES at Step S504), the rotation control unit 105 determines whether the received post processing setting is actually available (Step S506). In the second embodiment, the rotation control unit 105 determines whether the received post processing setting is actually available by referring to the table illustrated in FIG. 15. The table illustrated in FIG. 15 is stored in a storage device (not illustrated).

When determining that the received post processing setting is actually available (YES at Step S506), the rotation control unit 105 rotates each page on the basis of the received post processing setting such that the sides of the same lengths are aligned as described above (Step S507). On the other hand, when determining that the received post processing setting is not actually available (NO at Step S506), the rotation control unit 105 rotates each page such that the second and later pages are arranged in the same orientation as that of the first page (Step S505). The above described is the details of the page rotation process performed by the information processing apparatus according to the second embodiment.

As described above, according to the second embodiment, pages are rotated on the basis of the size and the orientation of a page of a document to be printed and the post processing setting, so that even when sheets of different sizes are mixed in an original to be printed or even when the post processing is set, it is possible to accurately and easily preview a printing result.

According to one aspect of the embodiment, even when sheets of different sizes are mixed in an original to be printed or even when the post processing is set, it is possible to accurately and easily preview a printing result.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a size detecting unit that detects a size of each page of a document to be processed;
   an orientation detecting unit that detects orientation of each page of the document;

a receiving unit that receives a setting of post processing that is to be performed on a printed sheet on which the document is printed;

a determining unit that determines whether pages of different sizes, both having one side of the same length and other sides of different lengths, are detected in the document;

a rotation control unit that, when the determining unit determines that the pages of the different sizes have been detected, rotates pages so that sides of the same length are aligned on the basis of the setting of the post processing received by the receiving unit, wherein the determining unit determines whether two different sizes are detected by the size detecting unit, when a first page of the document is of a smaller size of the two sizes and is arranged in a portrait orientation, the rotation control unit rotates pages such that a page of the smaller size is arranged in the portrait orientation and a page of a larger size of the two sizes is arranged in a landscape orientation, and when the first page of the document is of the smaller size and arranged in the landscape orientation, and when the first page of the document is of the larger size and arranged in the portrait orientation, the rotation control unit rotates pages such that a page of the smaller size is arranged in the landscape orientation and a page of the larger size is arranged in the portrait orientation, and wherein when the first page of the document is of the smaller size and arranged in the portrait orientation, and if the post processing setting received by the receiving unit indicates open to left the rotation control unit rotates a page of the larger size to left, when the first page of the document is of the smaller size and arranged in the portrait orientation, and if the post processing setting received by the receiving unit indicates open to right, the rotation control unit rotates a page of the larger size to right, and when the first page of the document is of the smaller size and arranged in the landscape orientation, and when the first page of the document is of the larger size and arranged in the portrait orientation, the rotation control unit rotates a page of the larger size page to right.

2. The information processing apparatus according to claim 1, further comprising a display unit that displays a print preview screen of the document with the rotated pages.

3. The information processing apparatus according to claim 1, further comprising:

an output unit that outputs the document with the rotated pages to outside, transmits the document with the rotated pages to an image forming apparatus connected to the outside, and causes the image forming apparatus to print the document.

4. The information processing apparatus according to claim 1, wherein the rotation control unit rotates the pages in accordance with a predetermined rotation direction that is set in an image forming apparatus connected to outside.

5. A computer program product comprising a non-transitory computer-usable medium having computer-readable program codes embodied in the medium, wherein the program codes when executed by a computer causes the computer to execute:

(a) detecting a size of each page of a document to be processed;

(b) detecting orientation of each page of the document;

(c) receiving a setting of post processing that is to be performed on a printed sheet on which the document is printed;

(d) determining whether pages of different sizes, both having one side of the same length and other sides of different lengths, are detected in the document;

(e) rotating, when it is determined that the pages of the different sizes have been detected at the detecting the size, pages so that sides of the same length are aligned on the basis of the setting of the post processing received at the receiving;

(f) determining whether two different sizes are detected in (b);

(g1) rotating, when a first page of the document is of a smaller size of the two sizes and is arranged in a portrait orientation, pages such that a page of the smaller size is arranged in the portrait orientation and a page of a larger size of the two sizes is arranged in a landscape orientation;

(g2) rotating, when the first page of the document is of the smaller size and arranged in the landscape orientation, and when the first page of the document is of the larger size and arranged in the portrait orientation, the pages such that a page of the smaller size is arranged in the landscape orientation and a page of the larger size is arranged in the portrait orientation;

(g3) rotating, when the first page of the document is of the smaller size and arranged in the portrait orientation, and if the post processing setting received in (c) indicates open to left, a page of the larger size to left;

(g4) rotating, when the first page of the document is of the smaller size and arranged in the portrait orientation, and if the post processing setting received in (c) indicates open to right, a rotation control unit rotates a page of the larger size to right;

(g5) rotating, when the first page of the document is of the smaller size and arranged in the landscape orientation, and when the first page of the document is of the larger size and arranged in the portrait orientation, a page of the larger size page to right.

6. An information processing method for an information processing apparatus, the information processing method comprising:

(a) detecting a size of each page of a document to be processed;

(b) detecting orientation of each page of the document;

(b) receiving a setting of post processing that is to be performed on a printed sheet on which the document is printed;

(d) determining whether pages of different sizes, both having one side of the same length and other sides of different lengths, are detected in the document;

(e) rotating, when it is determined that the pages of the different sizes have been detected at the detecting the size, pages so that sides of the same length are aligned on the basis of the setting of the post processing received at the receiving;

(f) determining whether two different sizes are detected in (b);

(g1) rotating, when a first page of the document is of a smaller size of the two sizes and is arranged in a portrait orientation, the pages such that a page of the smaller size is arranged in the portrait orientation and a page of a larger size of the two sizes is arranged in a landscape orientation.

(g2) rotating, when the first page of the document is of the smaller size and arranged in the landscape orientation, and when the first page of the document is of the larger size and arranged in the portrait orientation, the pages such that a page of the smaller size is arranged in the landscape orientation and a page of the larger size is arranged in the portrait orientation;
(g3) rotating, when the first page of the document is of the smaller size and arranged in the portrait orientation, and if the post processing setting received in (c) indicates open to left, a page of the larger size to left;
(g4) rotating, when the first page of the document is of the smaller size and arranged in the portrait orientation, and if the post processing setting received in (c) indicates open to right, a rotation control unit rotates a page of the larger size to right;
(g5) rotating, when the first page of the document is of the smaller size and arranged in the landscape orientation, and when the first page of the document is of the larger size and arranged in the portrait orientation, a page of the larger size page to right.

* * * * *